(No Model.)
M. F. McCRAY.
CULTIVATOR.
No. 334,181. Patented Jan. 12, 1886.
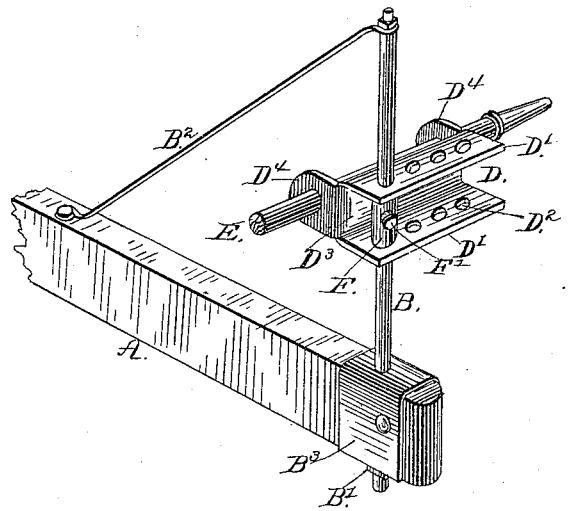
WITNESSES
R. W. Bishop.
G. P. Kramer.
Millard F. McCray
INVENTOR
by R. S. & A. P. Lacey
Attorneys.

UNITED STATES PATENT OFFICE.

MILLARD F. McCRAY, OF GLASSVILLE, MISSOURI.

CULTIVATOR.

SPECIFICATION forming part of Letters Patent No. 334,181, dated January 12, 1886.

Application filed September 23, 1885. Serial No. 177,938. (No model.)

*To all whom it may concern:*

Be it known that I, MILLARD F. McCRAY, a citizen of the United States, residing at Glassville, in the county of Caldwell and State of Missouri, have invented certain new and useful Improvements in Cultivators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My present invention is an improved coupling for cultivators, and is designed particularly for use on the cultivator for which Letters Patent No. 318,922 were issued to me May 26, 1885.

It consists in certain novel features, hereinafter fully described, and pointed out in the claim.

In the drawing I have shown a perspective view of my improved coupling.

A is the cultivator-beam. A standard, B, is erected near the forward end of the beam, and is secured by being passed entirely through the beam and held by a nut, B', on its lower end. A brace, B², is connected to the upper end of the standard, and secured upon the upper side of the beam. A clip, B³, is secured on the beam where the standard passes through it, to re-enforce and prevent the splitting of the same.

The coupling D consists of two horizontal lips, D' D', provided with a series of openings, D², and connected by a back piece, D³, formed integral with the said lips, and provided with two ears, D⁴ D⁴, which are bent at right angles to the said back piece and the horizontal lips D' D', as shown. These ears D⁴ D⁴ are provided with suitable openings, through which the axle E passes. A collar, F, is passed around the standard B between the lips D' D', and is provided with a set-screw, F', by means of which it is secured upon the standard at any desired height.

The beams may be set lower or higher, thereby regulating the depth of the furrow by loosening the set-screw F', when the desired adjustment can be readily effected and the coupling held in its adjusted position by tightening the said set-screw.

The distance between the two beams of the cultivator can be varied by means of the openings D², as will be readily understood. The coupling has a pivotal motion on the standard, the purposes of which are fully set forth in my former patent hereinbefore referred to.

The advantages of my present coupling over that shown in my former patent are obvious, as a more varied adjustment can be effected, thereby adding to the utility of the cultivator.

Having thus described my invention, what I claim, and desire to secure by Letters Patent, is—

The herein-described coupling for cultivators, consisting of two horizontal lips provided with a series of openings, through which is passed a standard secured to the cultivator-beam, a collar encircling the standard between the two horizontal lips and provided with a set-screw for securing it to the standard, and a back piece connecting the two lips and provided with two perforated ears, which receive the axle, substantially as described and shown.

In testimony whereof I affix my signature in presence of two witnesses.

MILLARD F. McCRAY.

Witnesses:
 T. J. JONES,
 GRANT OREM.